(12) United States Patent
Ledoux et al.

(10) Patent No.: US 8,098,066 B2
(45) Date of Patent: Jan. 17, 2012

(54) MAGNETOMETRIC DEVICE FOR EVALUATING A PHYSICAL PARAMETER, AND USE

(75) Inventors: Thomas Ledoux, Ceyrat (FR); Nathalie Levain, Clemont-Ferrand (FR); Denis Martin, Clemont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 498 days.

(21) Appl. No.: 12/342,036

(22) Filed: Dec. 22, 2008

(65) Prior Publication Data

US 2009/0165573 A1    Jul. 2, 2009

(30) Foreign Application Priority Data

Dec. 20, 2007 (FR) .................................... 07 60082

(51) Int. Cl.
*G01R 33/02* (2006.01)
(52) U.S. Cl. ........................ 324/244; 324/256
(58) Field of Classification Search ........................ None
See application file for complete search history.

(56) References Cited

U.S. PATENT DOCUMENTS

| | | | |
|---|---|---|---|
| 1,951,716 A * | 3/1934 | Varian | 324/345 |
| 4,310,807 A | 1/1982 | McKee | |
| 4,611,127 A | 9/1986 | Ibrahim et al. | |
| 4,893,076 A | 1/1990 | Leonard et al. | |
| 5,239,264 A * | 8/1993 | Hawks | 324/253 |
| 5,442,288 A * | 8/1995 | Fenn et al. | 324/244 |
| 6,452,382 B1 * | 9/2002 | Tokunaga et al. | 324/207.21 |
| 6,512,370 B1 * | 1/2003 | James | 324/253 |

* cited by examiner

*Primary Examiner* — Paresh Patel
(74) *Attorney, Agent, or Firm* — Cozen O'Connor

(57) ABSTRACT

A magnetometric device for evaluating a physical parameter (D, K), comprising a circuit (1) which is sensitive to a magnetic field, a measurement circuit (2) and a magnetic field generator (3), the sensitive circuit (1) being subjected to a magnetic field which varies with the physical parameter to be measured and having an electrical characteristic which is evaluated by the measurement circuit and which varies as a function of the magnetic field. The field generator (3) is designed to reverse the polarity of the applied magnetic field, the evaluation of the physical parameter thus being able to be corrected of the parasitic influence of the terrestrial magnetic field.

14 Claims, 5 Drawing Sheets

MAGNETOMETRIC DEVICE FOR EVALUATING A PHYSICAL PARAMETER, AND USE

RELATED APPLICATIONS

This application claims the priority of French patent application no. 07/60082 filed Dec. 20, 2007, the entire content of which is hereby incorporated by reference.

FIELD OF THE INVENTION

The invention relates in general to metrological techniques, particularly in the automotive field.

More specifically, the invention relates to a magnetometric device for evaluating a physical parameter, comprising a circuit which is sensitive to a magnetic field, a measurement circuit and a magnetic field generator, the sensitive circuit having an inductance which varies as a function of the magnetic field, the magnetic field generator being designed to subject the sensitive circuit to a magnetic field of a polarisation which varies with said physical parameter and which places the inductance in a variable permeability zone, and the measurement circuit being designed to measure an electrical characteristic of the sensitive circuit which changes as a function of the permeability of the inductance, the physical parameter being evaluated on the basis of at least one measurement of this electrical characteristic.

BACKGROUND OF THE INVENTION

The prior art gives the person skilled in the art many examples of magnetometric devices, in particular by the patent documents U.S. Pat. No. 4,893,076 and U.S. Pat. No. 4,611,127.

When measuring a magnetic field, either so as to ascertain the value thereof or so as to ascertain the value of another physical parameter which changes as a function of the measured magnetic field, and when the magnetic field to be measured is not the terrestrial magnetic field, the measurement obtained must be corrected of the value of the terrestrial magnetic field.

SUMMARY OF THE INVENTION

While this constraint can be overcome by a simple shift from zero in the case where the parasitic terrestrial magnetic field is fixed, one object of the invention is to provide a magnetometric device which is designed to remedy the error introduced by the existence of the terrestrial magnetic field including when the latter is variable, for example in the case where the magnetometric device is installed onboard a vehicle.

To this end, one aspect of the invention is directed to a device which otherwise corresponds to the generic definition given above, and having a field generator that is designed to reverse the polarity of the polarisation field. The measurement circuit is designed to carry out, respectively during the application of the polarisation field with two reverse polarities, two corresponding measurements of the electrical characteristic. The physical parameter is evaluated on the basis of at least these two measurements of the electrical characteristic.

The evaluated physical parameter consists for example of the distance separating the magnetic field generator from the sensitive circuit, or varies monotonically as a function of this distance.

The sensitive circuit may comprise a resonant circuit, in which case the electrical characteristic may consist of the specific resonant frequency of this resonant circuit.

It is then advantageous, at least in this case, if the sensitive circuit comprises an induction coil equipped with a saturable magnetic core, it being possible for this core to consist at least partially of a soft material selected for example from the group consisting of amorphous materials, nanocrystalline materials, iron/nickel alloys, iron/silicon alloys and ferrites.

Preferably, this saturable magnetic core extends from either side of the induction coil, beyond this coil, and may even be shaped as an intrinsically closed loop, surrounding at least part of the induction coil.

In one possible embodiment of the invention, the measurement circuit comprises a pulse generator capable of exciting the resonant circuit and may also comprise a frequency meter capable of measuring the specific resonant frequency of the magnetic resonant circuit, or the corresponding period.

In another possible embodiment, the device of the invention may comprise an isochronous oscillator including at least the resonant circuit and an active component, the measurement circuit itself comprising a frequency meter.

In the case where the sought physical parameter does not consist directly of the specific resonant frequency or the specific resonant period of the resonant circuit, the measurement circuit also comprises a measurement sub-circuit which includes the frequency meter and is designed to determine this physical parameter on the basis of this resonant frequency or this resonant period.

The device of the invention can be used in particular for determining the load of a tire or of a set of tires of a vehicle.

This use may in particular be carried out by providing that the magnetic field generator and the sensitive circuit are separated from one another by a distance which varies monotonically as a function of this load.

BRIEF DESCRIPTION OF THE DRAWINGS

Other features and advantages of the invention will become clearly apparent from the following description which is given purely by way of example and in a non-limiting manner, with reference to the appended drawings, in which.

DETAILED DESCRIPTION OF THE DRAWINGS

Figure 1A:
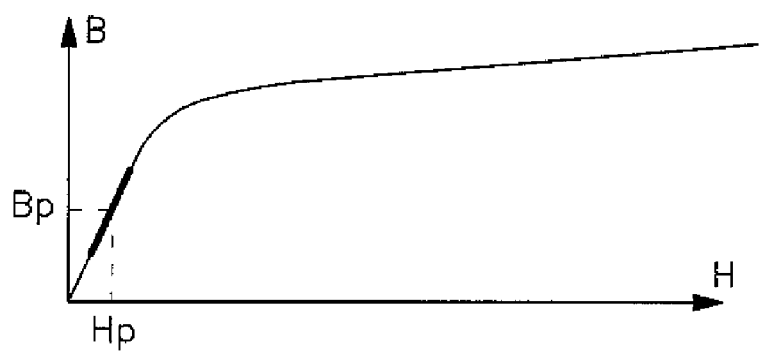
FIGS. 1A to 1C are diagrams showing the change in magnetic induction in a material of variable magnetic permeability as a function of the magnetic field to which this material is subjected.

As mentioned above, the invention relates to a magnetometric device using a circuit 1 which is sensitive to a magnetic field, a measurement circuit 2 and a magnetic field generator 3, this device making it possible to evaluate a physical parameter, such as a distance hereinafter denoted D or a load hereinafter denoted K.

The sensitive circuit 1 is preferably designed in the form of a resonant circuit 11 comprising at least (FIGS. 5 and 6) an induction coil 110 equipped with a core 119, and one or more capacitors 111, 111a and 111b.

This capacitor or these capacitors has/have an overall capacitance C, and the coil 110 has, with its core 119, an inductance L which varies as a function of the magnetic field to which this coil is subjected.

In practice, these impedances are supplemented by an electrical resistance R which consists at least of the intrinsic resistance of the coil 110.

Under these conditions, the resonant circuit 11 has, in a known manner, a resonant frequency F1 equal to:

$$F1 = \frac{1}{2\pi} \cdot \frac{1}{\sqrt{L.C}}$$

and a quality factor Q equal to:

$$Q = \frac{1}{R} \cdot \sqrt{\frac{L}{C}}.$$

The magnetic field generator 3, which comprises for example an induction coil 30 optionally equipped with a core 39, is designed to subject the sensitive circuit 1 to a magnetic polarisation field, of which the flux which reaches the sensitive circuit 1 varies with the physical parameter D or K to be evaluated.

The magnetic field created by the generator 3 is moreover dimensioned so as to place the inductance L of the assembly consisting of the coil 110 and its core 119 in a variable permeability zone.

It will be recalled that the inductance L of a coil depends:
on its geometry (shape, dimensions),
on the number of turns thereof,
on the permeability of its core, and
on the surrounding magnetic field, since the permeability of its core varies with this field, as is the case here for the coil 110.

Figure 1B:
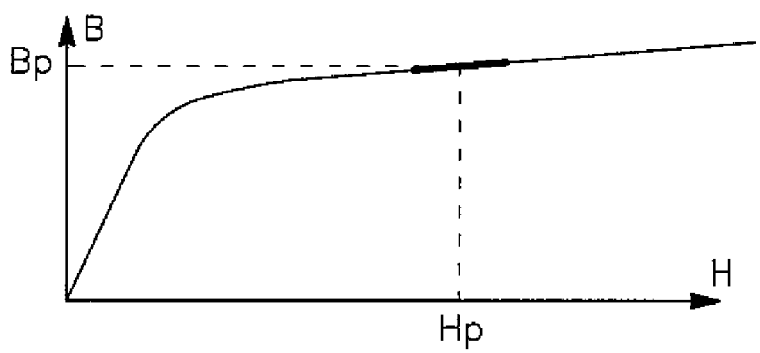
Figure 1C:
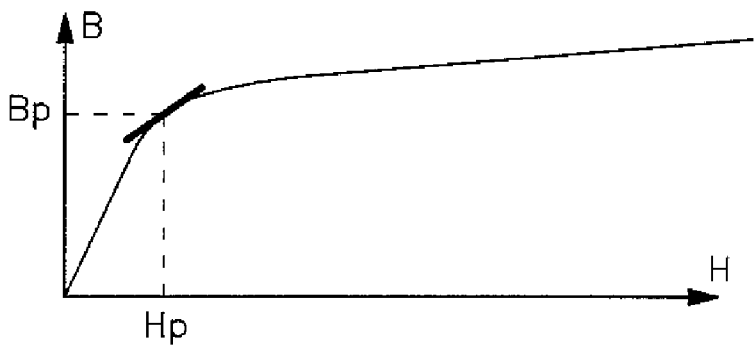

FIGS. 1A to 1C show an example of a magnetisation curve B(H) of the core of a coil such as 110, for its main magnetisation axis.

In these figures, H denotes in a generic manner the surrounding magnetic field to which the coil 110 is subjected, also known as the magnetic polarisation field, B denotes in a generic manner the magnetic induction of the core 119 of the coil 110, Hp denotes a particular value of the polarisation field, and Bp denotes the value assumed by the magnetic induction of the core 119 for the field Hp.

At each operating point defined by the value Hp of the field H, the permeability $\mu$ of the core 119, which is equal to the product $\mu_o \cdot \mu_r$ where $\mu_o$ is the permeability of a vacuum and $\mu_r$ is the relative permeability, is shown by the tangent to the magnetisation curve B(H) at this operating point.

This curve B(H) has three distinct zones illustrated by FIGS. 1A to 1C.

At the low values of the field H (FIG. 1A), the permeability $\mu$ of the core 119, that is to say the slope of the segment shown in bold centred on the values Hp and Bp of FIG. 1A, has a high value but does not vary when the value Hp varies while remaining in the same zone of the magnetisation curve.

At the high values of the field H (FIG. 1B), the core 119 is saturated so that its permeability $\mu$, that is to say the slope of the segment shown in bold centred on the values Hp and Bp of FIG. 1B, has a low value but also does not vary when the value Hp varies while remaining in the same zone of the magnetisation curve.

On the contrary, for the intermediate values of the field H (FIG. 1C), a very small variation in the value Hp of the field H in this intermediate value zone causes a very large variation in the permeability $\mu$ of the core 119, that is to say in the slope of the segment shown in bold centred on the values Hp and Bp of FIG. 1C.

As already mentioned above, the magnetic field applied by the generator 3 to the coil 110 and to its core 119 is precisely calibrated so as to place this core 119 in its variable permeability zone shown in FIG. 1C.

Under these conditions, the inductance L of the assembly consisting of the coil 110 and the core 119 is therefore also highly variable as a function of the applied magnetic field H.

The measurement circuit 2 is for its part designed to measure an electrical characteristic which is specific to the resonant circuit 11 and which changes monotonically as a function of the permeability of the inductance L, and therefore as a function of the magnetic field H.

This electrical characteristic may therefore consist of the resonant frequency F1 of the resonant circuit 11, equal to $$\frac{1}{2\pi} \cdot \frac{1}{\sqrt{L.C}},$$

or of the quality factor Q of this circuit 11, equal to $$\frac{1}{R} \cdot \sqrt{\frac{L}{C}}.$$

Since, by hypothesis, the changes in the physical parameter D or K to be measured and the changes in the magnetic field H are linked to one another, theoretical or experimental knowledge of the law linking D or K to H makes it possible to evaluate D or K as a function of H and vice versa, on the basis of at least one measurement of the electrical characteristic.

The rest of the present description illustrates embodiments of the invention in which the resonant frequency F1 of the resonant circuit 11 is used as the electrical characteristic.

According to the invention, the field generator 3 is designed to reverse the polarity of the polarisation field H.

Furthermore, the measurement circuit 2 is designed to carry out at least one first measurement F11 of the electrical characteristic F1 during the application of the polarisation field H with its first polarity, and to carry out a second measurement F12 of this electrical characteristic F1 during the application of the polarisation field H with its second polarity.

Thus, instead of being evaluated on the basis of a single measurement F11 of the electrical characteristic FT, the physical parameter D or K can be evaluated on the basis of at least these two measurements F11 and F12.

Figure 3:
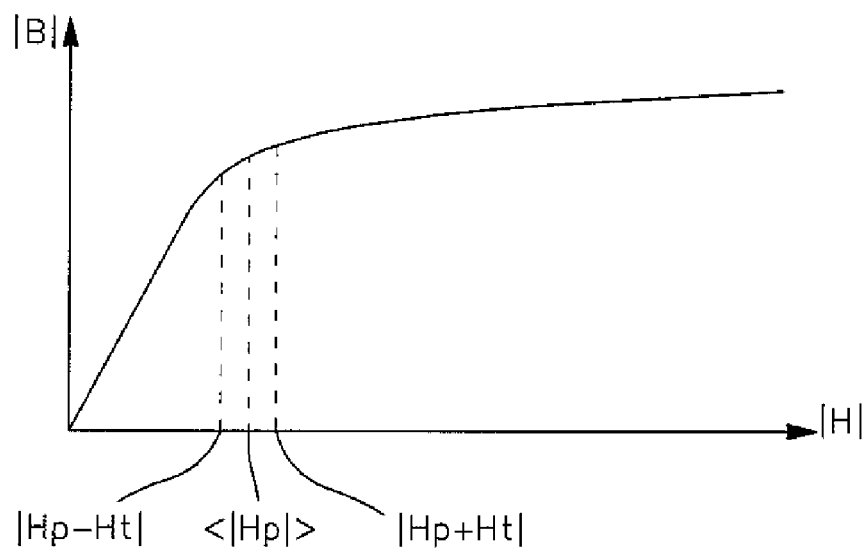
FIG. 3 is a diagram similar to those of FIGS. 1A to 1C, illustrating the principle of the invention.

The effect of this arrangement is shown in FIG. 3, which consists of a magnetisation curve similar to FIGS. 1A and 1C but on which the field H and the magnetic induction B are represented as absolute values, the negative values of H and B thus being folded into the domain of the positive values of this field and of this induction.

When the magnetic field Hp produced by the generator 3 opposes the terrestrial magnetic field Ht, the resultant field applied to the resonant circuit has the absolute value |Hp−Ht|.

This value |Hp−Ht| can therefore be deduced from a first measurement F11 of the resonant frequency F1 carried out during the application of the field Hp with a first polarity, and from the knowledge of the physical laws linking the field H to the permeability μ of the core 119, the permeability μ of the core 119 to the inductance L of the resonant circuit 11, and the inductance L of the resonant circuit 11 to the specific resonant frequency F1 of this circuit 11.

When the magnetic field Hp produced by the generator 3 acts in the same direction as the terrestrial magnetic field Ht, the resultant field applied to the resonant circuit has the absolute value |Hp+Ht|.

This value |Hp+Ht| can therefore be deduced from a second measurement F12 of the resonant frequency F1 carried out during the application of the field Hp with a second polarity, and from the knowledge of the physical laws linking the field H to the permeability μ of the core 119, the permeability μ of the core 119 to the inductance L of the resonant circuit 11, and the inductance L of the resonant circuit 11 to the specific resonant frequency F1 of this circuit 11.

By reversing the polarity of the magnetic field Hp and by obtaining the two measurements F11 and F12 of the electrical characteristic F1 which correspond to a total magnetic field of respective amplitudes |Hp−Ht| and |Hp+Ht|, it is thus possible to deduce therefrom, using the half-sum (|Hp−Ht|+|Hp+Ht|)/2 or any other mathematical tool known per se, an estimated value <|Hp|> of the amplitude of the magnetic field Hp produced by the generator 3 and picked up by the sensitive circuit 1.

Figure 2:
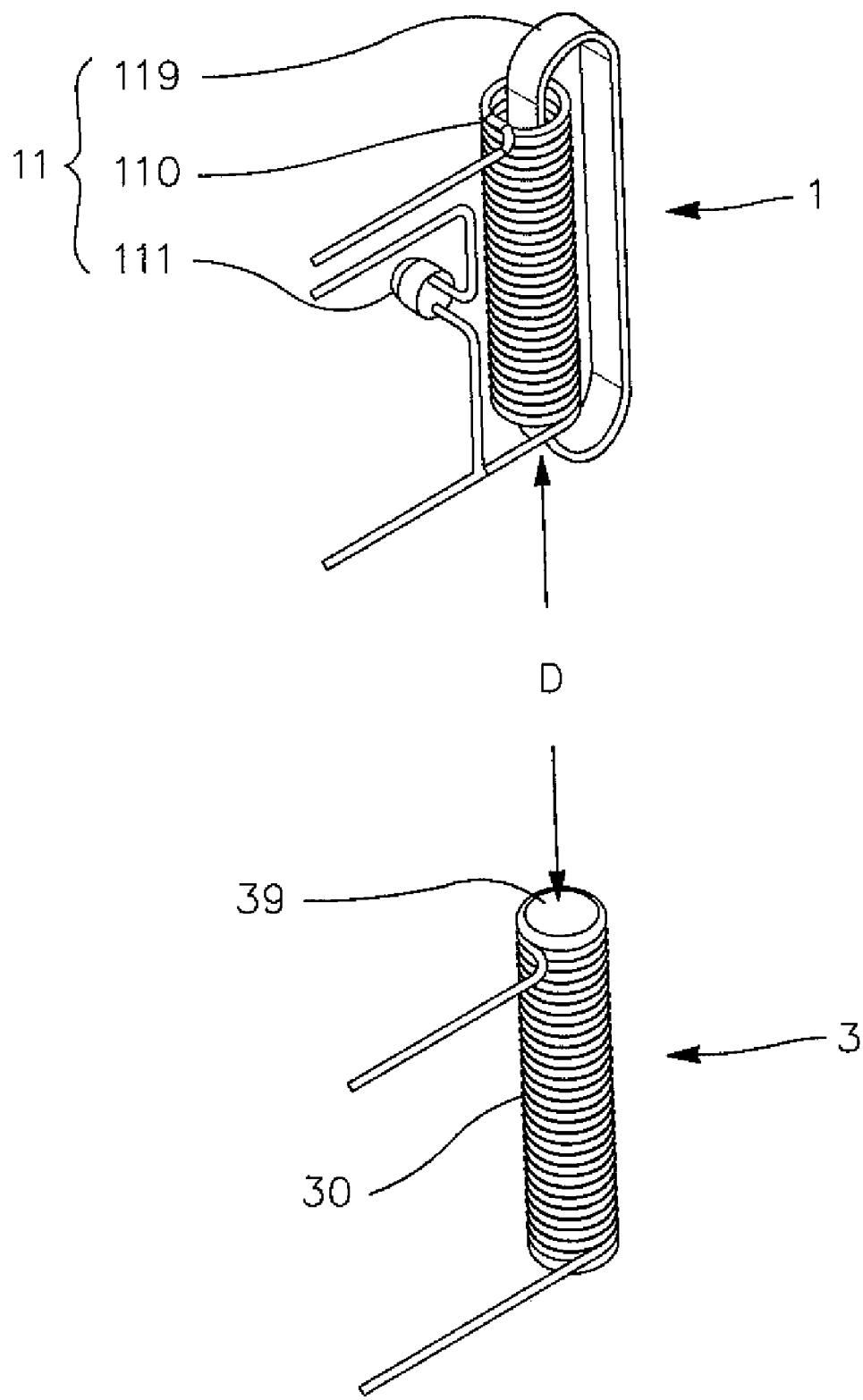
FIG. 2 is a perspective view of part of a device according to the invention, including a resonant circuit and a magnetic field generator.

In particular, since the field Hp produced by the generator 3 and picked up by the sensitive circuit 1 depends on the distance D between this generator 3 and the sensitive circuit 1 (FIG. 2), it is possible to evaluate this distance D, as a variable physical parameter, for a constant or at least known value of the field H.

Figure 4:
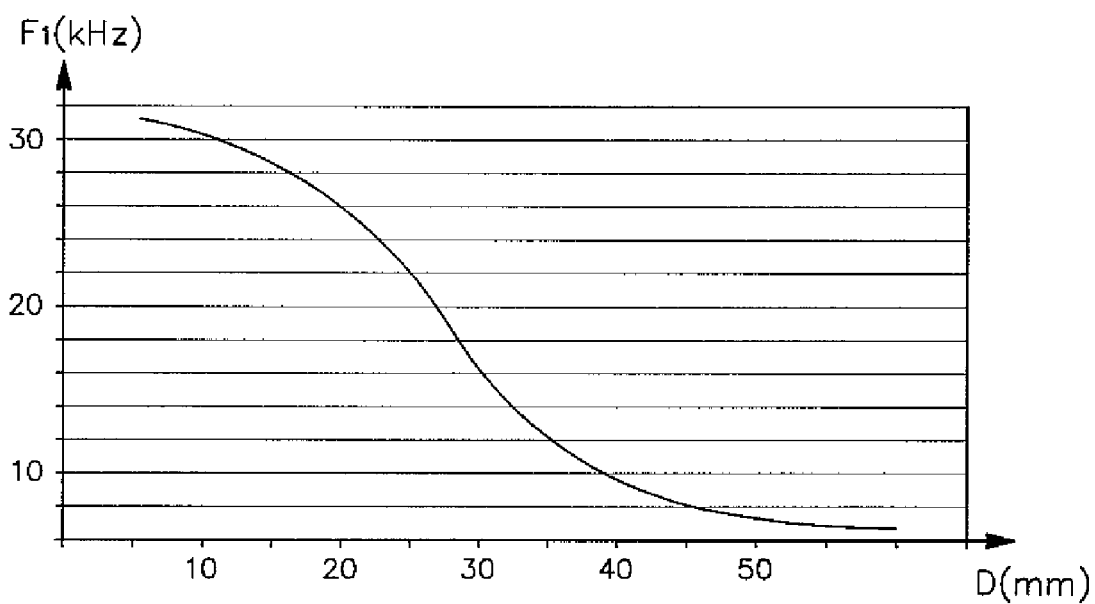
FIG. 4 is a diagram illustrating the change in resonant frequency of the resonant circuit shown in FIG. 2 as a function of the distance separating this resonant circuit from the field generator.

FIG. 4 illustrates, for one particular embodiment of the invention, the change in the resonant frequency F1 of the resonant circuit 11, expressed as kHz and corrected of the influence of the terrestrial magnetic field Ht, as a function of the distance D separating this resonant circuit 11 from the field generator 3.

Preferably, the saturable magnetic core 119 of the induction coil 110 consists at least partially of a soft material, that is to say a material with a low coercive field, selected from the group consisting of amorphous materials, nanocrystalline materials, iron/nickel alloys, iron/silicon alloys and ferrites.

Preferably, this saturable magnetic core 119 extends from either side of the induction coil 110, beyond this coil, and is ideally shaped as an intrinsically closed loop (FIG. 2), surrounding all or part of the induction coil 110.

Figure 5:
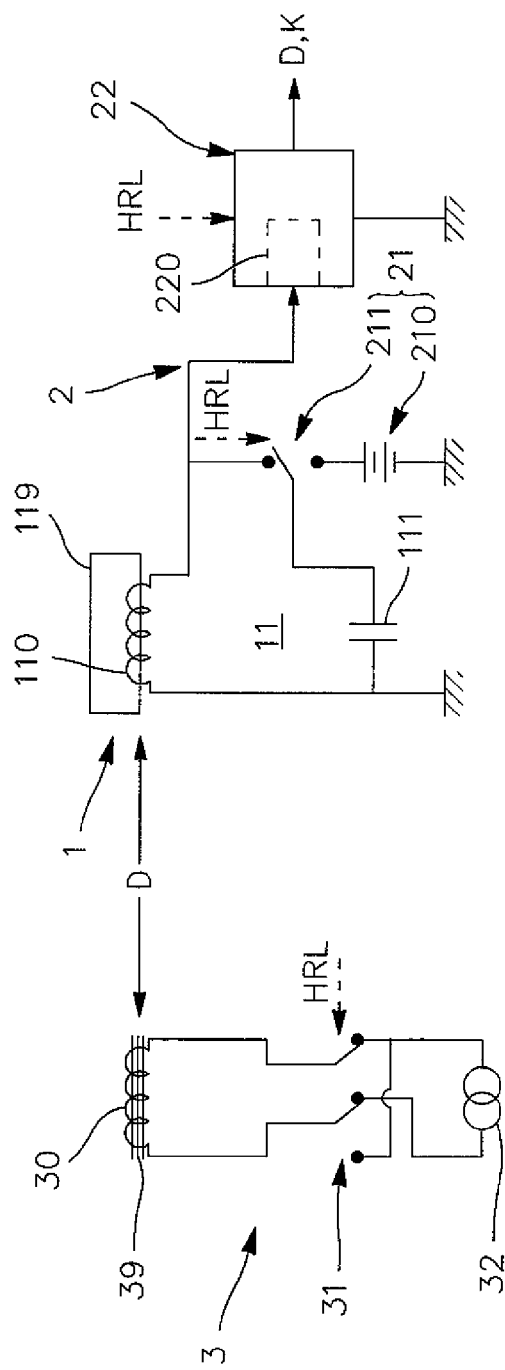
FIG. 5 is a block diagram of a first possible embodiment of the invention.
Figure 6:
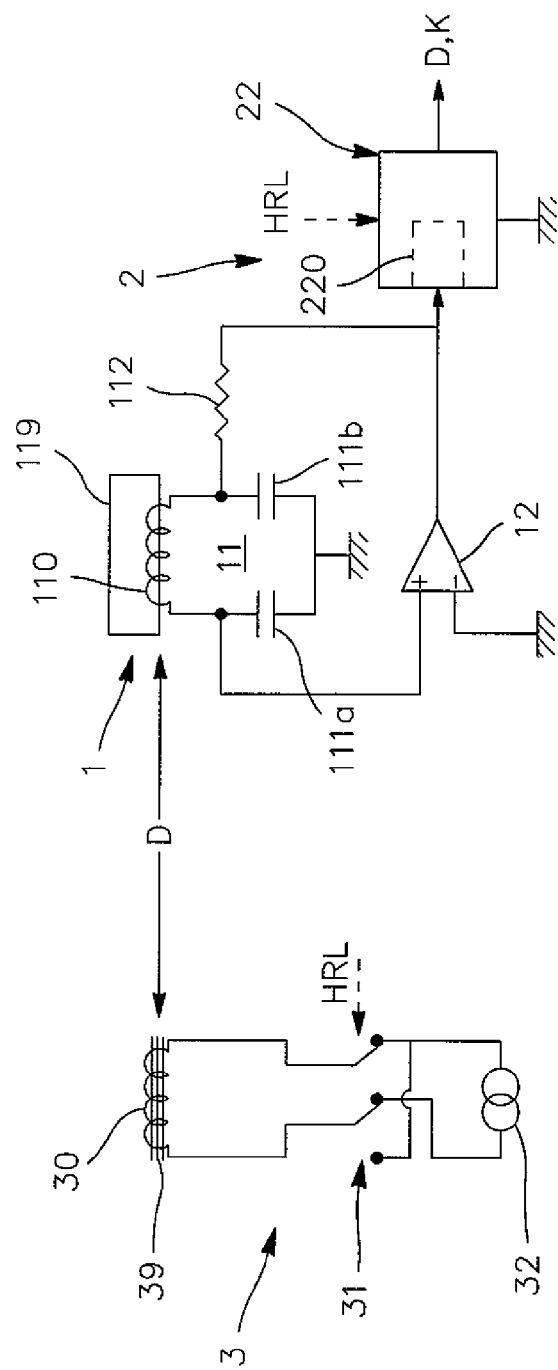
FIG. 6 is a block diagram of a second possible embodiment of the invention.

Two particular embodiments of the invention are shown in FIGS. 5 and 6.

In each of these figures, the magnetic field generator 3 is formed of an induction coil 30 equipped with a core 39 and associated with an electrical power source 32 and with a polarity reverser 31 which is driven by a clock signal HRL.

However, this generator could also consist of a permanent magnet which is periodically driven in rotation through 180 degrees about its median axis.

In the embodiment of FIG. 5, the measurement circuit 2 comprises a pulse generator 21 capable of exciting the resonant circuit 11.

This pulse generator 21 consists for example of an electrical power source 210 and a switch 211 which is driven by the clock signal HRL.

The switch 21 periodically recharges the capacitor 111 of the resonant circuit 11 by connecting it to the source 210, then re-closes the resonant circuit 11, the output of which supplies a pseudoperiodic relaxation signal of frequency F1 to a frequency meter 220.

By convention, the term "frequency meter" is used here in a very broad functional sense and denotes any circuit, device or apparatus capable of measuring directly or indirectly the resonant frequency F1 of the magnetic resonant circuit 11, or the corresponding period, equal to 1/F1.

In the embodiment of FIG. 6, the device of the invention comprises an isochronous oscillator which consists at least of the resonant circuit 11 and of one or more active components such as an operational amplifier 12.

The resonant circuit 11 may comprise a plurality of capacitors such as 111*a* and 111*b* and is mounted for example in series with a resistor 112 in the feedback loop of the amplifier 12.

Mounted in this way, the output of the amplifier 12 permanently produces a signal oscillating at the resonant frequency F1 of the magnetic resonant circuit 11, which is supplied to a frequency meter 220.

In each of the embodiments of FIGS. 5 and 6, the measurement circuit 2 comprises a measurement sub-circuit 22 which includes the frequency meter 220 and is designed to determine the physical parameter D or K on the basis of the specific resonant frequency F1 or the specific resonant period 1/F1 of the resonant circuit 11.

For example, this measurement sub-circuit 22 may be clocked by the clock signal HRL and may comprise a memory which contains, in the form of one or more maps, the law linking each pair of values F11 and F12 to an estimated value <FT> of the resonant frequency F1 corrected of the influence of the terrestrial magnetic field, and the law, illustrated in FIG. 4, which links the distance D to the value <F1> corrected of this influence.

Figure 7:
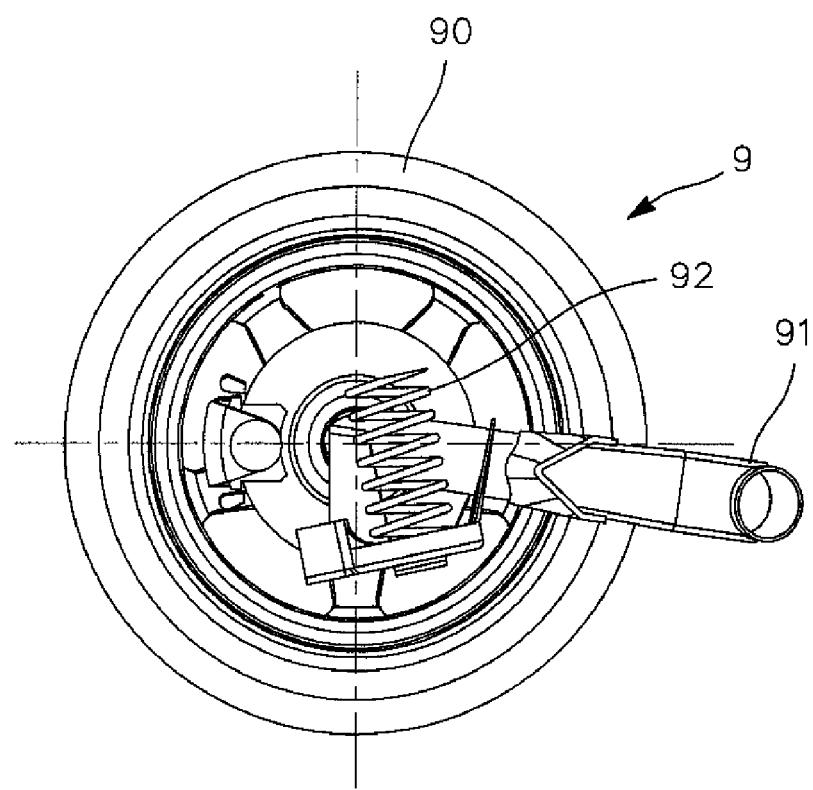
FIG. 7 is a schematic partial view in elevation of a suspension element of a motor vehicle.
Figure 8:
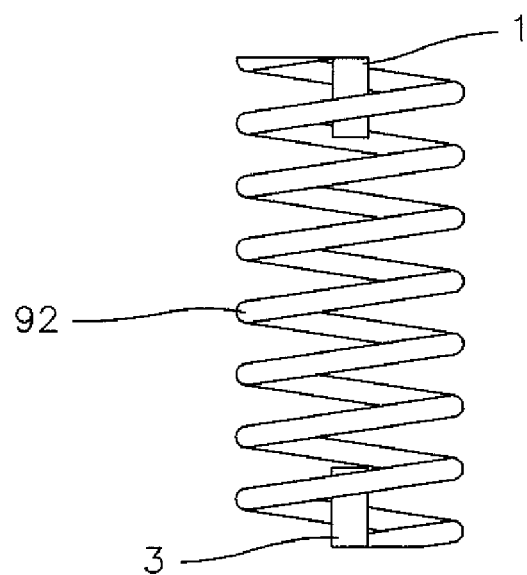
FIG. 8 is a view of the suspension spring visible in FIG. 7, to which the resonant circuit and the magnetic field generator visible in FIG. 2 are secured.

FIGS. 7 and 8 show a use of the invention for determining the load K of a tire or of a set of tires of a vehicle.

As can be seen in FIG. 7, each wheel 9 of a terrestrial vehicle supports some of the suspended elements of this vehicle, in particular by means of an arm 91 and elastic members such as a spring 92.

The higher the load K applied to a wheel 9, and therefore to the tire 90 equipping this wheel, the more compressed the elastic suspension member 92 associated with this wheel.

Since the law linking the compression of this member to the load is measurable and known in advance, it is possible to use this compression to vary the distance D between the magnetic field generator 3 and the sensitive circuit 1 and to deduce the load K of the wheel 9 from the measurement of this distance D.

For example, as shown in FIG. 8, the magnetic field generator 3 and the sensitive circuit 1 may be secured to respective ends 921 and 922 of the spring 92.

More generally, the magnetic field generator 3 and the sensitive circuit 1 may be secured to parts of the vehicle which are separated by a distance D which varies monotonically with the load K of a tire 90 or of a set of tires.

In this case, it is sufficient to integrate the law linking the distance D to the load K in the map(s) stored in the measurement sub-circuit 22 in order to obtain a direct evaluation of the load K from the evaluation of the distance D.

The invention claimed is:

1. A magnetometric device for evaluating a physical parameter (D, K), comprising:
 a circuit (1) which is sensitive to a magnetic field;
 a measurement circuit (2); and
 a magnetic field generator (3),
 wherein the sensitive circuit (1) has an inductance (L) which varies as a function of the magnetic field, the magnetic field generator (3) being adapted to subject the sensitive circuit (1) to a magnetic field of a polarisation which varies with said physical parameter (D, K) and which places the inductance (L) in a variable permeability zone, and the measurement circuit (2) being adapted to measure an electrical characteristic (F1) of the sensitive circuit (1) which changes as a function of the permeability of the inductance (L), the physical parameter (D, K) being evaluated on the basis of at least one measurement (F11) of this electrical characteristic (F1)
 wherein the field generator (3) is adapted to reverse the polarity of the polarisation field,
 wherein the measurement circuit (2) is adapted to carry out, respectively during the application of the polarisation field with two reverse polarities, two corresponding measurements (F11, F12) of the electrical characteristic (F1), and
 wherein said physical parameter (D, K) is evaluated on the basis of at least these two measurements (F11, F12) of the electrical characteristic (F1).

2. The device according to claim 1, wherein the evaluated physical parameter (D, K) consists of the distance (D) separating the magnetic field generator (3) from the sensitive circuit (1), or varies monotonically as a function of this distance (D).

3. The device according to claim 1, wherein the sensitive circuit (1) comprises a resonant circuit (11).

4. The device according to claim 3, wherein the electrical characteristic (F1) consists of the specific resonant frequency of the resonant circuit (11).

5. The device according to claim 4, wherein the measurement circuit (2) comprises a pulse generator (21) capable of exciting the resonant circuit (11).

6. The device according to claim 5, wherein the measurement circuit (2) also comprises a frequency meter (220) capable of measuring the specific resonant frequency (F1) of the magnetic resonant circuit (11), or the corresponding period (1/F1).

7. The device according to claim 6, wherein the measurement circuit (2) also comprises a measurement sub-circuit (22) which includes the frequency meter (220) and is designed to determine said physical parameter (D, K) on the basis of the specific resonant frequency (F1) or the specific resonant period (1/F1) of the resonant circuit (11).

8. The device according to claim 4, comprising an isochronous oscillator including at least the resonant circuit (11) and an active component (12), and in that the measurement circuit (2) comprises a frequency meter (220).

9. The device according to claim 1, wherein the sensitive circuit (1) comprises an induction coil (110) equipped with a saturable magnetic core (119).

10. The device according to claim 9, wherein said saturable magnetic core (119) consists at least partially of a soft material.

11. The device according to claim 10, wherein said soft material is selected from the group consisting of amorphous materials, nanocrystalline materials, iron/nickel alloys, iron/silicon alloys and ferrites.

12. The device according to claim 9, wherein said saturable magnetic core (119) extends from either side of the induction coil (110), beyond this coil.

13. The device according to claim 12, wherein said saturable magnetic core (119) is shaped as an intrinsically closed loop, surrounding at least part of the induction coil (110).

14. A method for determining the load (K) of a tire (90) or of a set of tires of a vehicle with a device according to claim 2, wherein the distance (D) separating the magnetic field generator (3) from the sensitive circuit (1) varies monotonically as a function of the load (K).

* * * * *